United States Patent [19]

Hasegawa

[11] 4,120,478
[45] Oct. 17, 1978

[54] GAS-HYDRAULIC PRESSURE TYPE ACTUATOR FOR PIPELINE VALVE

[75] Inventor: Akira Hasegawa, Yokohama, Japan

[73] Assignee: The Japan Steel Works, Ltd., Tokyo, Japan

[21] Appl. No.: 747,853

[22] Filed: Dec. 6, 1976

[30] Foreign Application Priority Data

Dec. 8, 1975 [JP] Japan ................................. 50-146517
Jul. 8, 1976 [JP] Japan ................................... 51-81680

[51] Int. Cl.² .................... F16K 31/143; F16K 31/12; F15B 15/22
[52] U.S. Cl. ........................................ 251/31; 251/26; 92/9
[58] Field of Search ...................... 92/9, 12, 8; 91/4 R; 251/26, 31

[56] References Cited

U.S. PATENT DOCUMENTS

| | | | |
|---|---|---|---|
| 887,517 | 5/1908 | Raub | 92/9 |
| 2,838,140 | 6/1958 | Rasmussen et al. | 92/9 |
| 3,100,965 | 8/1963 | Blackburn | 91/4 |
| 3,151,533 | 10/1964 | Hartel | 92/8 |
| 3,687,013 | 8/1972 | Haller | 92/8 |

*Primary Examiner*—Martin P. Schwadron
*Assistant Examiner*—A. Michael Chambers
*Attorney, Agent, or Firm*—Sughrue, Rothwell, Mion, Zinn and Macpeak

[57] ABSTRACT

An actuator 4 for a valve 2 disposed in a gas pipe line 1 is driven directly by the gas pressure in the pipe line, which is tapped off and supplied to the appropriate end of the actuator cylinder via an electromagnetic spool valve 12 or 25. A hydraulic transfer circuit couples the chambers on the piston rod sides of the actuator cylinder, and includes flow control valves 17, 18 for regulating the actuator speed and an oil expansion tank. The latter may be sealed and a positive pressure established therein to facilitate the oil transfer. A hand pump 22 may also be provided to implement the oil transfer and drive the actuator piston from the piston rod side if the gas pressure is too low to power the actuator.

5 Claims, 3 Drawing Figures

GAS-HYDRAULIC PRESSURE TYPE ACTUATOR FOR PIPELINE VALVE

BACKGROUND OF THE INVENTION

This invention relates to a gas-hydraulic pressure actuator for opening and closing a pipe line valve.

Gas-hydraulic pressure type actuators are commonly used for opening and closing ball valves in gas pipe lines. With such actuators, the gas being transported through the pipe line is used as the power source, and the gas pressure, rather than acting directly on the actuator cylinder, is applied to the upper portion of an oil filled pressure vessel. This converts the gas pressure to a hydraulic pressure, which is then tapped off from the lower portion of the pressure vessel and drivingly applied to the actuator cylinder. Such conversion of gas pressure into hydraulic pressure is advantageous because: the actuator cylinder is lubricated by the working oil; it is easier to control the opening and closing speed of the valve with oil as compared with gas; and if the gas pressure drops too low to power the actuator the valve can be opened or closed by operating a hydraulic hand pump.

A prior art actuator of this type is shown by way of example in FIG. 1, wherein reference numeral 1 designates a pipe line, 2 is a valve body, and 3 is a valve stem. A lever 4a of an actuator 4 is keyed to the valve stem 3, so as to open and close the valve in association with the stroke of the actuator piston. Gas outlet ports 2a and 2b in the upstream and downstream sides of the valve body are connected by pipes 5 and 6 to check valves 7 and 8, respectively. Outlet pipes 9 and 10 from the check valves merge into a pipe 11, which leads to a port 12p of an electromagnetic valve 12. A port 12a of the valve is connected to a gas inlet port 15a in the upper portion of a pressure vessel 15 by a pipe 13, while a port 12b of the valve 12 is connected to a gas inlet port 16a in the upper portion of a pressure vessel 16 by a pipe 14. The pressure vessels 15 and 16 are filled with a quantity of working oil such that when the valve 2 assumes an opening of 45°, the liquid level is maintained in the vertical mid portions of the vessels. Connected to oil outlet ports 15b and 16b in the lower portions of the pressure vessels are flow control valves 17 and 18, respectively, whose outlets are connected by pipes 19 and 20 to ports 21a and 21b of a change-over valve 21, respectively. The change-over valve has ports 21c and 21d connected to ports 4c and 4d of the actuator cylinder, and ports 21t and 21p connected to suction and discharge ports 22t and 22p of a hand pump 22, respectively.

In operation, some of the gas flowing through the pipe line 1 is released through whichever of the ports 2a or 2b is on the high pressure side, and arrives at the port 12p of the electromagnetic valve 12, irrespective of whether the valve 2 is open or closed. If the valve 12 is deenergized, the port 12p is blocked, while the ports 12a and 12b are open to the atmosphere, as shown in FIG. 1. If the solenoid 12Sa of the valve 12 is energized, the valve spool is shifted to the right as viewed in FIG. 1, thereby communicating the ports 12a and 12p with each other. This introduces gas through the pipe 13 to the pressure vessel 15, which forcibly discharges oil from the vessel. This oil passes through the flow control valve 17, pipe 19, valve 21, and the port 4d into the actuator cylinder 4, whereby the piston and piston rod 4b are urged to the left to open the valve 2. Simultaneously with such piston movement, the oil in the other side of the cylinder is discharged through the port 4c, valve 21, pipe 20 and flow control valve 18 into the pressure vessel 16. The flow rate of this oil is adjusted by the control valve 18, so that the speed of the actuator 4 in opening the valve 2 is thereby regulated. The upper portion of the pressure vessel 16 is vented to the atmosphere through the valve 12. After the valve 2 has been fully opened, the solenoid 12Sa is deenergized. Consequently, the valve spool resumes the position shown in FIG. 1, and the pressurized gas in vessel 15 is released through port 15a and valve 12 to the atmosphere. In a similar manner, if the solenoid 12Sb of the valve 12 is energized, the valve spool is shifted to the left and the actuator 4 will operate to close the valve 2.

If the gas pressure in the pipe line 1 becomes too low to produce sufficient hydraulic pressure to open the valve 2, then the valve 21 is shifted to the left. Consequently, the suction port 22t of the hand pump 22 becomes connected by way of ports 21t and 21a to the valve 17 below the pressure vessel 15. On the other hand, the discharge port 22p of the hand pump 22 is connected by way of ports 21p and 21d to the port 4d of the actuator cylinder. If, under these conditions, the hand pump 22 is operated, the valve 2 will be manually opened. In a similar manner, if the valve 21 is shifted to the right, the manual operation of the hand pump 22 will close the valve 2.

Such a prior art gas-hydraulic pressure type valve actuator imposes a number of system requirements. First, the pressure vessels 15 and 16 for converting the gas pressure into hydraulic pressure must be high pressure containers, and they must have a volume several times as large as the volume of oil displaced by one stroke of the actuator 4. Second, an increase in the size of the valve 2 greatly increases the cost of the actuator system. Third, since the pressure vessels 15 and 16 are normally vented to the atmosphere, a relatively large volume of gas is necessary to raise the pressure in the vessels to an operational level at the time of valve actuation, and such gas is subsequently lost when it is vented to the atmosphere. Stated otherwise, the volume of gas consumed or wasted during a valve actuation is several times the volume of the actuator cylinder.

Actually, it is highly advantageous for the actuator to convert a gas pressure into a hydraulic pressure. The use of pressure vessels for effecting such a conversion, however, is accompanied by a number of drawbacks, as described above.

SUMMARY OF THE INVENTION

The present invention is accordingly directed to providing a gas-hydraulic pressure type valve actuator which utilizes the advantages of hydraulic pressure, but dispenses with the prior art pressure vessels, whereby the drawbacks attendant therewith are eliminated.

Briefly, and in accordance with the present invention, an actuator for a gas pipe line valve is driven directly by the gas pressure in the pipe line, which is tapped off and supplied to the appropriate end of the actuator cylinder via an electromagnetic spool valve. A hydraulic transfer circuit couples the chambers on the piston rod sides of the actuator cylinder, and includes flow control valves for regulating the actuator speed and an oil expansion tank. The latter may be sealed and a positive pressure established therein to facilitate the oil transfer and avoid tank overflow and spillage problems. A hand pump may also be provided to implement the oil transfer and drive the actuator piston from the piston rod side if the gas pressure is too low to power the actuator.

DETAILED DESCRIPTION OF THE PREFERRED EMBODIMENTS

Figure 1:
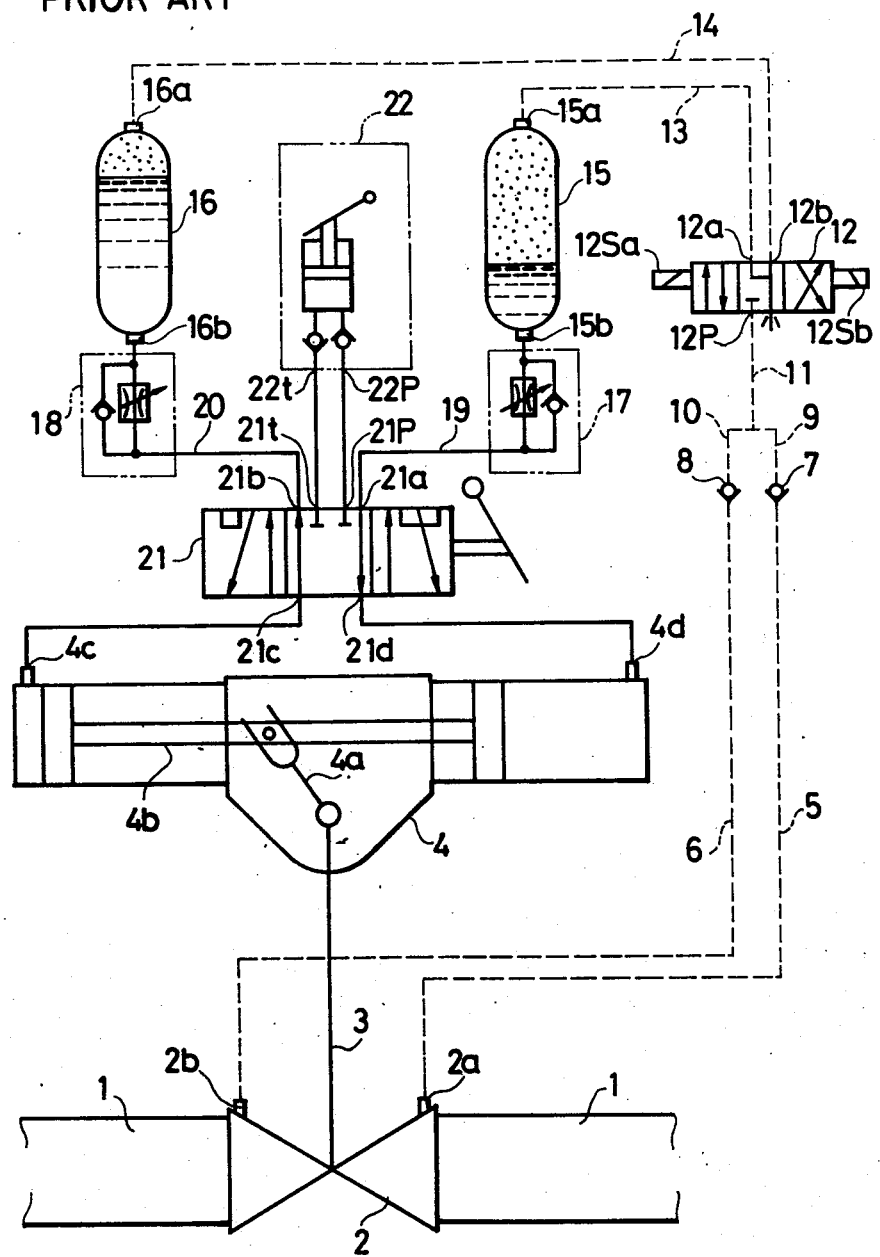
FIG. 1 shows, in schematic form, the construction of a gas-hydraulic pressure type valve actuator of the prior art, FIG. 2 diagramatically shows a gas-hydraulic pressure type valve actuator according to a first embodiment of the present invention, and FIG. 3 diagramatically shows a second embodiment of the present invention, similar to that of FIG. 2, but employing a closed expansion tank.
Figure 2:
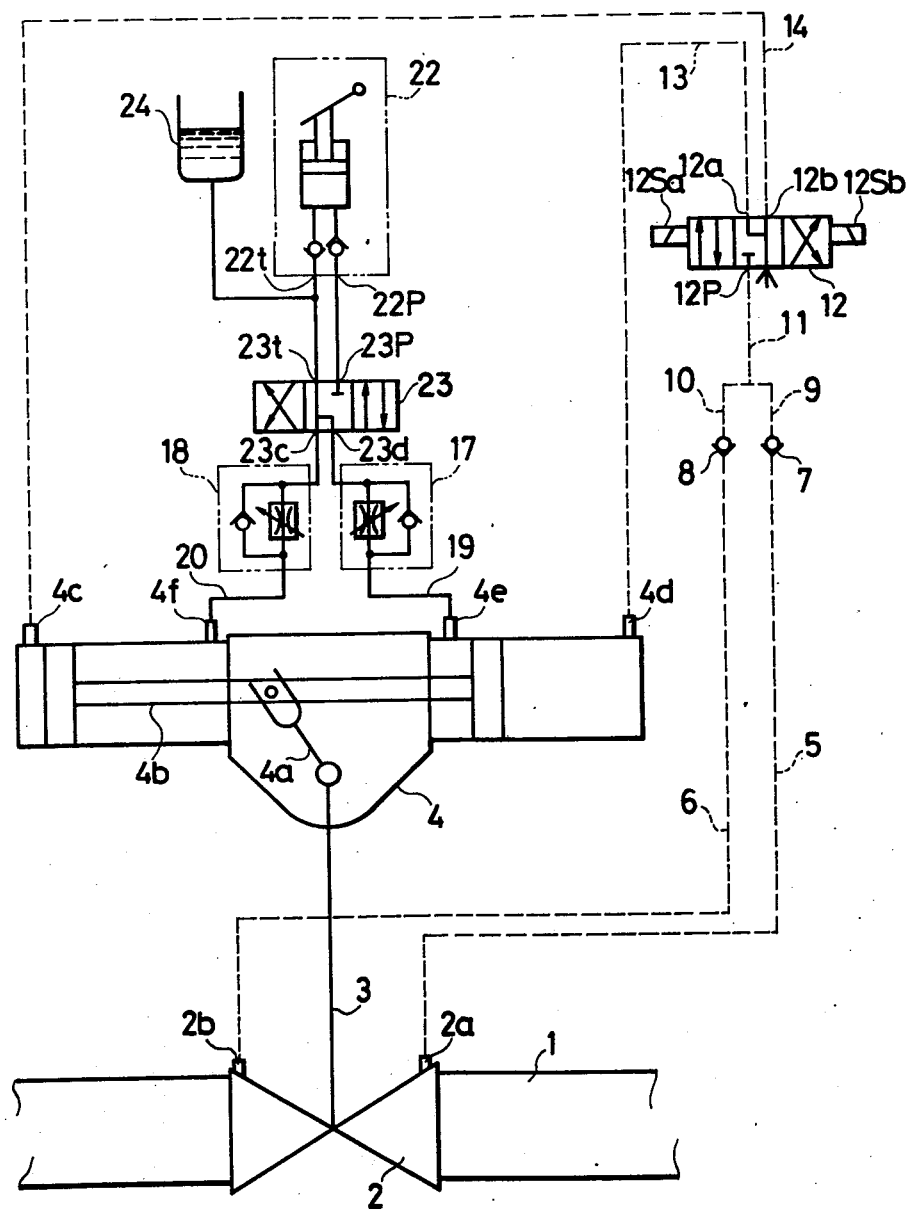

Referring now to a first embodiment of the present invention, as shown in FIG. 2, the components having the same function as those shown in FIG. 1 are designated by the same reference numerals. The description will therefore be directed only to the differences from the prior art system shown in FIG. 1. The actuator of the present invention is essentially distinguished in construction from the prior art system in that; the outlet ports 12a and 12b of the electromagnetic valve 12 are directly connected to the ports 4d and 4c of the actuator cylinder, respectively; ports 4e, 4f are provided in the actuator cylinder on the piston rod sides thereof whereby the central or mid-portions of the cylinder function as separate pressure chambers; and a small capacity pressure head or expansion tank 24 is connected to the suction side of the hand pump 22. The change-over valve 23 is also different in spool construction and function from the valve 21 in FIG. 1.

In operation, if the solenoid 12Sa of the electromagnetic valve 12 is energized, the line gas is introduced through port 12a directly into the actuator cylinder port 4d, thereby urging the piston and piston rod 4b to the left to open the valve 2. At the same time, the oil in the piston rod side of the right half of the cylinder is forced out through port 4e and passes, via pipe 19, flow control valve 17, communicating ports 23d and 23c of the change-over valve 23, flow control valve 18 and pipe 20, into the left half of the cylinder through port 4f. This is a pure oil transfer flow, and the tank 24 allows for any thermal expansion or contraction of the oil, as well as for oil seepage or loss. The flow rate of the oil is regulated by the control valve 17, whereby the speed of operation of the valve is controlled. In a similar manner, if the solenoid 12Sb of the electromagnetic valve 12 is energized, the valve 2 will be moved to a closed position.

If the pipe line pressure is too low to operate the valve actuator, the change-over valve 23 is switched to the right, whereby the discharge port 22p of the hand pump 22 communicates with the port 4f of the actuator cylinder via communicating ports 23p, 23c, flow control valve 18 and pipe 20. The port 4e of the actuator cylinder in turn communicates, via pipe 19, flow control valve 17, and communicating ports 23d, 23t, with the suction port 22t of the hand pump. If the hand pump is operated under these conditions, the hydraulic pressure thus created in the left half, piston rod side of the actuator cylinder will open the valve 2. Conversely, if the change-over valve 23 is shifted to the left, then the operation of the hand pump will close the valve. Whenever the actuator piston reaches the end of its stroke after the opening or closing of the valve, the exposed portion of the cylinder wall will be lubricated with oil.

Under certain conditions, dependent upon the gas pressure in the pipe line 1 and the settings of the flow control valves 17, 18, some overflow or spillage from the tank 24 may be encountered if the valve is opened or closed too fast and a vacuum is created in one of the actuator cylinder halves. The embodiment of the present invention shown in FIG. 3 is designed to avoid this problem.

Figure 3:
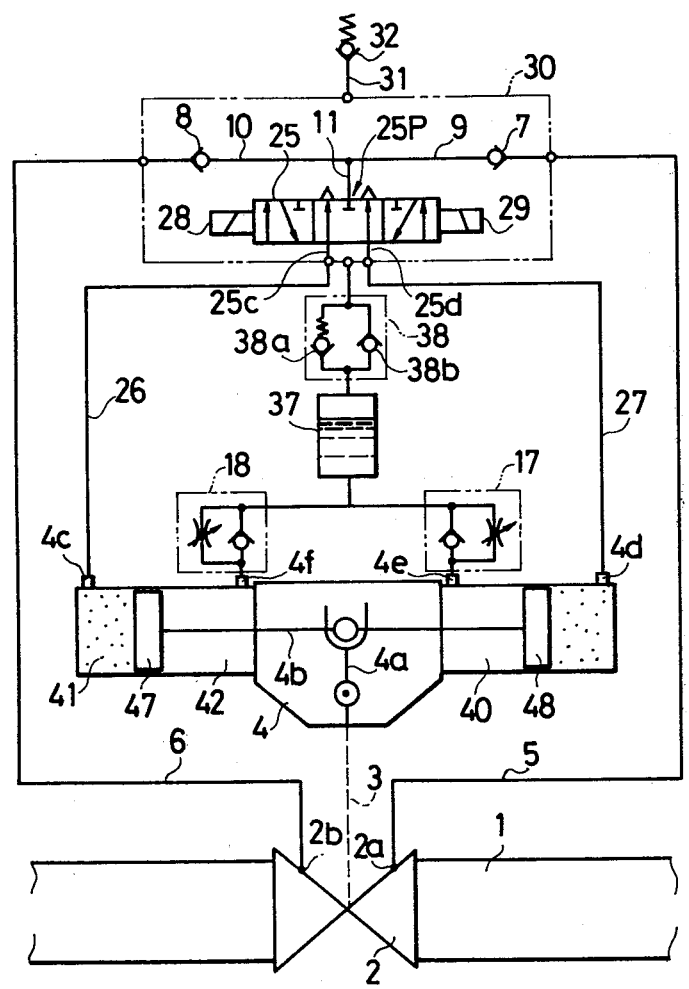

Referring now to FIG. 3, the junction pipe 11 is connected to a port 25p of a three-way electromagnetic change-over valve 25. Pipes 26 and 27 connect the change-over valve 25 to the ports 4c and 4d of the actuator cylinder, respectively. Solenoids 28 and 29 switch the change-over valve from one position to another. A container 30 houses the change-over valve, and is constructed so that exhaust gases from the valve are discharged through an exhaust pipe 31 and a check valve 32 to the atmosphere. The flow control valves 17 and 18 are connected to the bottom of a sealed expansion tank 37. The top of the tank is connected to an intake-exhaust valve 38 comprising an exhaust valve 38a and an intake valve 38b. The intake-exhaust valve 38 is connected at its other end to the container 30 for the change-over valve.

In operation, if the solenoid 28 is energized the change-over valve spool is shifted to the right, and gas from the pipe line 1 flows through the communicated ports 25p and 25d, and the pipe 27 into the actuator cylinder through port 4d, thereby urging the actuator piston 48 and rod 4b to the left to open the valve 2. The speed of the actuator piston is controlled by the variable throttle of the speed control valve 17, which allows oil to escape from the cylinder chamber 40 into the expansion tank 37. The piston 47 discharges gas from the cylinder chamber 41, and at the same time sucks oil from the expansion tank 37 into the cylinder chamber 42.

Where an open type expansion tank is used, as in the embodiment of FIG. 2, a vacuum may be created in the cylinder chamber 42. This, together with an increase in the resistance of the oil flow path from the tank to the chamber 42, may cause the tank to fill with the oil forced out of chamber 40 and overflow.

With the sealed expansion tank 37 used in FIG. 3, however, the oil in the cylinder chamber 40 creates a pressure in the tank 37, which speeds up and facilitates the suction of oil into the cylinder chamber 42, without any risk of overflow. If the exhaust valve 38a is set at a proper level, then if the seal of pistons 47 or 48 is lost and high pressure gas is thus introduced from the pipe line 1 into the tank 37 through the cylinder chambers 42 or 40, such gas will be vented through the exhaust valve 38a. This enables the economizing use of a relatively thin walled, low pressure tank 37. On the other hand, if the oil and gas in the upper portion of the tank 37 contracts due to a lowered ambient temperature, any vacuum created in the tank is relieved through the intake valve 38b. Further, since the intake and exhaust valve 38 is connected to the container 30, the provision and proper biasing or setting of the check valve 32 ensures the creation of a positive pressure in the tank 37, thus allowing the valve 2 to be opened and closed at a relatively high speed. That is, the gas from the unpressurized end of the actuator cylinder is vented through pipe 26 or 27 and valve 25 into the container 30, to thereby establish a positive pressure in the container under the control of check valve 32. This pressure is applied to the tank 37 through the intake valve 38b. In addition, since the tank 37 is sealed and thereby isolated from the surrounding atmosphere, contamination by dust and moisture is avoided.

As is readily apparent, the energization of solenoid 29 shifts the change-over valve spool to the left, communicates ports 25p and 25c to pressurize chamber 41 and close the valve 2, while at the same time venting port 25d into the container 30.

What is claimed is:

1. An actuator assembly for opening and closing a gas pipeline valve (2), comprising:
   (a) an actuator cylinder (4),
   (b) a pair of spaced pistons disposed in the cylinder and coupled together for joint movement in the cylinder by a connecting rod (4b),
   (c) means (3) coupling the connecting rod to the pipeline valve,
   (d) a selective pressure supply valve (12),
   (e) means (5, 6) coupling gas pressure from the pipeline to an input port of the supply valve,
   (f) means (13, 14) individually coupling output ports of the supply valve to opposite ends of the actuator cylinder on the piston face side of each piston, whereby gas pressure may be applied directly to a selected end of the cylinder to drive the coupled pistons and open or close the pipeline valve,
   (g) a pair of flow control valves (17, 18),
   (h) a change-over valve (23) connected in series between the flow control valves, and
   (i) hydraulic circuit means (19, 20) individually and directly connecting the respective flow control valves in series between hydraulic chambers defined in the actuator cylinder on the connecting rod side of each piston, whereby hydraulic fluid is transferred from one chamber to the other through the flow control valves in response to the movement of the coupled pistons, and the flow control valves thereby regulate the speed of the coupled pistons.

2. An actuator assembly as defined in claim 1, further comprising a hand pump (22) connected to the hydraulic circuit means through the change-over valve, whereby the hand pump may be operated to drive the coupled pistons in a desired direction by applying hydraulic pressure to the connecting rod side of one of the pistons if the gas pressure in the pipeline becomes too low to directly drive the pistons.

3. An actuator assembly as defined in claim 2, further comprising a hydraulic fluid expansion tank (24) connected to the hydraulic circuit means.

4. An actuator assembly for opening and closing a gas pipeline valve (2), comprising:
   (a) an actuator cylinder (4),
   (b) a pair of spaced pistons disposed in the cylinder and coupled together for joint movement in the cylinder by a connecting rod (4b),
   (c) means (3) coupling the connecting rod to the pipeline valve,
   (d) a selective pressure supply valve (25),
   (e) means (5, 6) coupling gas pressure from the pipeline to an input port of the supply valve,
   (f) means (26, 27) individually coupling output ports of the supply valve to opposite ends of the actuator cylinder, whereby gas pressure may be applied directly to a selected end of the cylinder to drive the coupled pistons and open or close the pipeline valve,
   (g) a pair of flow control valves (17, 18),
   (h) hydraulic circuit means connecting the flow control valves in series between hydraulic chambers defined in the actuator cylinder on the connecting rod side of each piston, whereby hydraulic fluid is transferred from one chamber to the other through the flow control valve in response to the movement of the coupled pistons, and the flow control valve thereby regulates the speed of the coupled pistons,
   (i) a housing (30) surrounding the selective pressure supply valve (25),
   (j) an intake-exhause valve (38) and a sealed hydraulic fluid expansion tank (37) connected in series between the housing (30) and the hydraulic circuit means,
   (k) means venting gas from the non-selected end of the actuator cylinder to the housing, and
   (l) a biased exhaust valve (32) connected to the housing to create a positive pressure therein, whereby said positive housing pressure is applied to the hydraulic circuit means via the intake-exhaust valve and the sealed expansion tank to thereby increase the transfer speed of the hydraulic fluid, and attendantly, increase the speed of the coupled pistons.

5. An actuator assembly as defined in claim 4, wherein the intake-exhaust valve comprises a further biased exhaust valve (38a) and an intake valve (38b) connected to the sealed tank, whereby a positive pressure is established and maintained in the tank to thereby further facilitate the hydraulic fluid transfer.

* * * * *